United States Patent [19]

Norris

[11] Patent Number: 4,868,586
[45] Date of Patent: Sep. 19, 1989

[54] REVERSIBLE DRIVING MECHANISM FOR ELECTRONIC PRINTER

[75] Inventor: Philip R. Norris, North Reading, Mass.

[73] Assignee: Polaroid Corporation, Cambridge, Mass.

[21] Appl. No.: 261,609

[22] Filed: Oct. 24, 1988

Related U.S. Application Data

[63] Continuation-in-part of Ser. No. 188,265, Apr. 29, 1988, Pat. No. 4,804,982.

[51] Int. Cl.⁴ ............................................. G01D 15/00
[52] U.S. Cl. .................................. 346/145; 346/107 R
[58] Field of Search ..................... 346/150, 153.1, 160, 346/107 R, 108, 139 R, 145; 355/8; 358/300, 302

[56] References Cited

U.S. PATENT DOCUMENTS

| | | |
|---|---|---|
| 1,268,048 | 5/1918 | Norman . |
| 1,421,163 | 6/1922 | Burrows . |
| 1,918,587 | 7/1933 | Bryant . |
| 2,158,536 | 5/1939 | Fisher et al. ............................. 66/50 |
| 2,467,592 | 4/1949 | Morgan et al. ....................... 250/63 |
| 3,927,256 | 12/1975 | Fujimoto .............................. 178/7.6 |
| 4,159,813 | 7/1979 | Yale .............................. 242/158.4 A |
| 4,800,400 | 1/1989 | Douglas ........................... 346/107 R |
| 4,809,020 | 2/1989 | Agulnek ............................... 346/160 |

Primary Examiner—Arthur G. Evans
Attorney, Agent, or Firm—Leslie J. Payne; Edward S. Roman

[57] ABSTRACT

There is disclosed an electronic printing apparatus which prints images on sucessive individual film units held in a cassette. A carriage assembly which mounts the cassette can be driven by a driving mechanism in different directions and at different speeds in response to a coupling mechanism being actuated by an actuator assembly. The acutator assembly includes a coil spring which is wrapped on a lead screw of the driving mechanism for actuating a coupling member of the coupling mechanism.

4 Claims, 8 Drawing Sheets

FIG. I

REVERSIBLE DRIVING MECHANISM FOR ELECTRONIC PRINTER

CROSS REFERENCE TO RELATED APPLICATION

This application is a continuation-in-part, U.S. Pat. No. 4,804,982 application of Ser. No. 188,265 filed on April 29, 1988 by Philip R. Norris entitled "PRINTER HAVING REVERSIBLE DRIVING MECHANISM".

BACKGROUND OF THE INVENTION

The present invention relates generally to electronic printers and, more particularly, a driving mechanism for use in such printers which mechanism effectively and efficiently reversibly reciprocates, at different speeds, a carriage holding image recording material.

This invention relates to an improvement of an electronic printer of the type described in commonly assigned and copending application U.S. application Ser. No. 158,585 entitled "ELECTRONIC IMAGE PRINTING APPARATUS", filed February 22, 1988 by Lawrence M. Douglas. As described in said application, the electronic printer includes a film carriage which reciprocates at a constant speed, by a common drive mechanism, between a start printing position and a film processing position. Removably mounted on the film carriage is a film pack or cassette containing a plurality of stacked individual film units of the self-developing kind, such as manufactured by Polaroid Corporation. The film carriage advances linearly at a very slow rate to define a slow scan movement. During the slow scan movement, beams of light are scanned quickly across the image areas of each film unit in registry with the film pack aperture. This fast scanning is in a direction generally transverse to the slow scan direction. The combination of the fast and slow scan movements provides for raster scan imaging on individual ones of the film units. The film carriage is driven at a constant speed by a common motor and lead screw arrangement.

While the above driving mechanism functions satisfactorily, it is desired, in certain situations, to increase the return speed of the film carriage to the start printing position following movement thereof to the film processing position. Such an increase would, of course, increase the total number of film units which could be printed per unit time.

It is, therefore, desired to provide a driving mechanism which not only reversibly reciprocates the film carriage at different speeds, but can achieve the foregoing in a manner which is simple and compact in construction and which does not add significantly to the overall cost of the printer.

SUMMARY OF THE INVENTION

It is an object of this invention to improve upon printers of the above noted type. In accordance with the present invention there is provided an electronic image printing apparatus for printing images on respective ones of a plurality of image recording units which are releasably retained in a cassette therefor. The apparatus comprises a housing assembly and means disposed in the housing assembly for mounting the cassette for bidirectional movement between start printing and processing positions. Provision is made for means for providing at least a beam of light and for modulating the light beam in response to electronic signals corresponding to an image of a subject selected for printing. Provision is made for light scanning means being operable for scanning the modulated light beam across a preselected scanning line on the image recording unit. There is provided means for optically directing the modulated light beam to the light scanning means and from the light scanning means to an image plane of one of the image recording units. There is provided driving means operable for reciprocating the cassette mounting means between the start and processing positions, wherein as the light scanning means scans the modulated light beam across the scanning line, the driving means advances the cassette mounting means in a printing direction from the start printing position to the processing position so that a raster scan image of the subject to be printed is formed on the recording unit by the modulated light beam. Disposed in the housing assembly is a means for ejecting successive image recording units from the cassette and the housing assembly.

In an illustrated embodiment, the cassette driving means includes at least a pair of spaced apart and generally parallel threaded driving shafts mounted for rotation at different speeds with respect to each other. In such embodiment, there is provided a coupling means connected to the cassette mounting means and shiftable in response to actuation thereof to selectively engage one or the other of the driving shafts for alternately linearly reciprocating the cassette mounting means at different speeds between the start and processing positions. The coupling means includes a toggle nut coupling member mounted pivotally on the cassette mounting means for pivotal movement between the driving shafts. The coupling member has dual threaded portions on opposed surfaces thereof. Each of the threaded portions is selectively engageable with and disengageable from respective ones of the threaded driving shafts in response to shifting of the coupling member. Provision is made for overcenter biasing means of the coupling member. The overcenter biasing means facilitates the urging of respective ones of the threaded portions into and out of engagement with respective ones of the driving shafts. The coupling means also includes spaced apart actuator assemblies for shifting the coupling member overcenter to effect the noted selective engagement and disengagement of the driving shafts.

In one illustrated embodiment, at least one of the actuator assemblies is defined by a coil spring wrapped on one of the driving shafts. An actuating end of the spring engages a surface on the toggle nut and rotation of the wrap spring forces the toggle nut overcenter.

Among the other objects of the present invention are, therefore, the provision of an electronic printing apparatus which has a drive mechanism that simply and reliably drives a carriage holding the image recording units between two positions at different speeds; the provision of an apparatus of the above noted type wherein the drive mechanism simply and reliably allows the carriage to be coupled to either one of a pair of driving shafts; and, the provision of a driving mechanism of the above noted type which does not add significantly to the cost of the printer.

These and other objects and features and the invention itself will become apparent from the following description when taken in conjunction with the accompanying drawings wherein like structure throughout the several views are indicated by like reference numerals.

DETAILED DESCRIPTION

Reference is made to FIGS. 1-10 for showing a preferred embodiment of an improved electronic image printing apparatus 20 of the present invention. The printer 20 relates generally to the electronic printer of the type described in the previously noted application. Accordingly, a detailed description of the printer 20 will not be given since many of the details thereof do not, per se, form part of the present invention. Such a detailed description is, however, incorporated herein and only those features considered necessary to explain and understand the present invention will be given.

Figure 5:
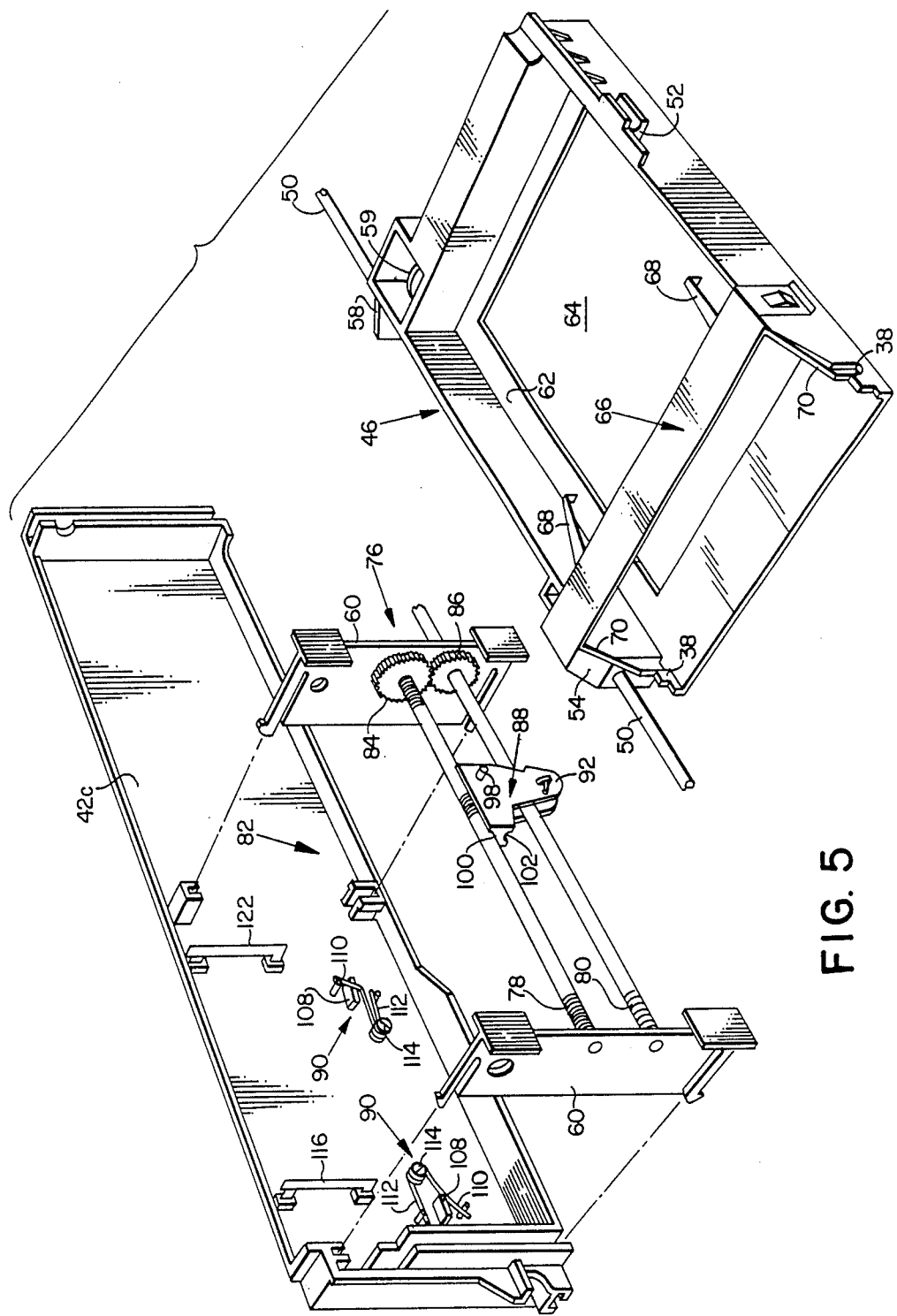
FIG. 5 is an exploded perspective view of several components forming the printing apparatus of the present invention.
Figure 5B:
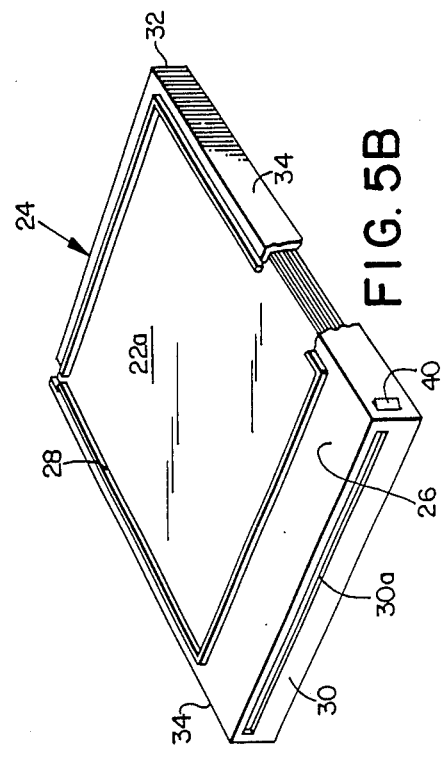
FIGS. 5A and 5B show respectively a film unit and film cassette of the type to be used in conjunction with the printing apparatus.
Figure 5A:
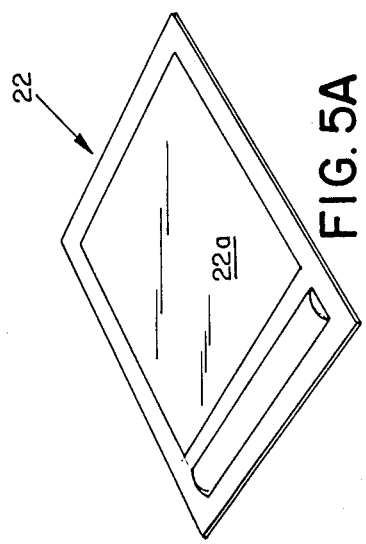

The electronic image printing apparatus 20 is intended for use in generating and developing images on individual ones of a plurality of photosensitive film units 22 (FIG. 5A). These units 22 are of the self-developing type, such as the kind manufactured by Polaroid Corporation. Other image recording media are contemplated for use. Whatever kinds are selected though, they should of course, be sensitive to exposure by a suitable source of energy used for recording purposes. Typically, each of the film units 22 includes an image forming area 22a bordered by a frame having a rupturable pod of processing fluid, which pod is ruptured following processing by the electronic image printing apparatus 20 in a manner described more fully in the last noted application. Basically, such a film unit 22 is advanced to and between a pair of pressure applying spread rollers, to be described later. The spread rollers cause rupturing of the pod and spreading of the processing fluid between positive and image receiving elements (not shown) of the film unit 22 passing therebetween. This action initiates a known diffusion transfer process, whereby latent images on the image forming area 22a are developed. The film units 22, as is known, are held in a stacked array in a film cassette or box 24 (FIG. 5B). The film cassette 24 is a known type used for housing the film units 22 of the above described kind. Such a film cassette 24 is described more fully in the last noted application or, for example, in commonly assigned U.S. Pat. No. 4,685,791. However, a brief description thereof is given here for purposes of better understanding this invention.

Referring to FIG. 5B, the film cassette 24 includes a wall 26 defining a light exposure aperture 28 which is arranged to be in registry with the image forming area 22a of successive ones of the film units 22. The film cassette 24 includes a leading end wall assembly 30 having an exit slot 30a, an opposed rearward wall 32 and opposing sidewalls 34. A spring platen or pack spring (not shown) is arranged to provide a yieldable platform for the film units 22 so as to feed successive units to a focal plane defined by the cassette aperture 28. It should be noted that the film cassette 24 is arranged in the printer 20 so that the cassette aperture 28 faces downwardly. For ejecting each of the film units 22, the wall 26 is formed with an elongated recess or cutout which allows a picking mechanism, to be described later, to push successive exposed film units 22 through the exit slot 30a. The cassette 24 is formed with datum projections 40 on the opposite sidewalls 34 which assist in properly positioning the cassette.

Figure 1:
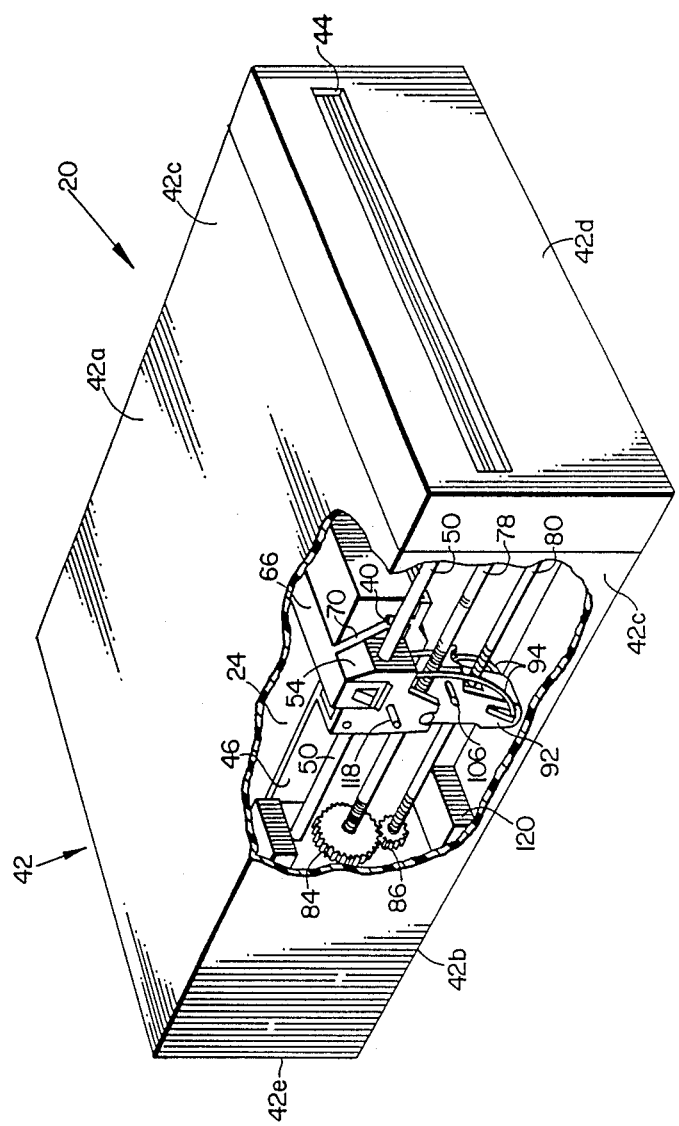
FIG. 1 is a perspective view of an electronic image printing apparatus of the present invention with portions thereof removed.

Continued reference is made to FIG. 1 for showing a portable housing assembly 42 of the printer 20. The housing assembly 42 includes a parallelpiped structure having top wall 42a, bottom wall 42b, opposing sidewalls 42c and respective front and back wall sections 42d and 42e. The film units 22 are intended to be ejected from the film cassette 24 and through the front wall section or door 42d. In this regard, the door 42d includes an exit or discharge slot 44 which is sized and shaped to allow sequential ejection of a dark slide and processed film units 22 therethrough. The front door 42d is mounted pivotally to the housing assembly 42 so as to allow the front loading and removal of the film cassette 24. The front door 42d is latched in the closed position by a latch (not shown).

Figure 6:
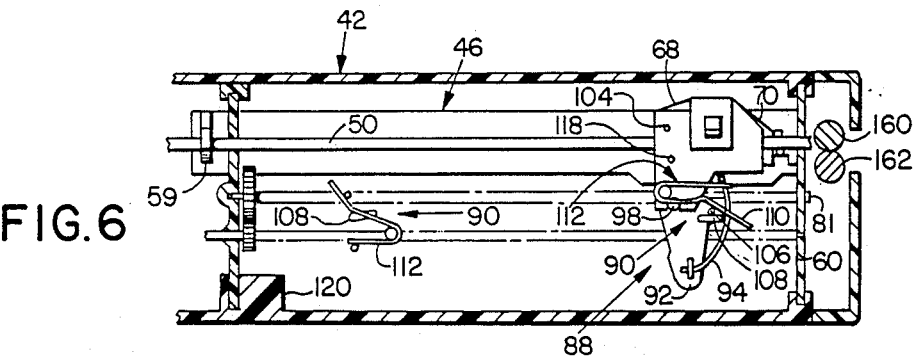
FIGS. 6-9 show different positions of operation of the printing apparatus.

A film cassette carriage 46 (FIGS. 1-5) is mounted in the interior of the housing assembly 42 for reciprocating movement along a predetermined linear path between an image start printing position (see FIG. 9) and a film unit processing position (see FIG. 6). The path is defined by a pair of spaced apart and generally parallel longitudinally extending guide rods 48, 50.

Laterally extending from a sidewall of the cassette carriage 46 is a holding bracket 52 which slidably supports the carriage for movement along the guide rod 48. Extending from the opposite carriage sidewall is a molded hollow block 54 which defines an internal bore 56 that is slidably supported on the guide rod 50. Also protruding from this side of the cassette carriage 46 is guide rod bracket 58 (FIG. 5) defining a guide rod opening through which the guide rod 50 extends. A leaf spring 59 (FIG. 5) upwardly biases the guide rod 50 against a vee-slot (not shown) in the guide rod bracket 58. By virtue of the foregoing construction, the cassette carriage 46 is securely guided to reciprocate along a linear path. Opposite end portions of the guide rod 50 are supported respectively in a pair of mounting plates 60 which have snap-fit connections to corresponding structure on one of the sidewalls 42c (see FIG. 5). Opposite ends of the guide rods 48, 50 are also supported in suitable structure of the housing assembly 42.

The cassette carriage 46 has a ledge portion 62 defining an aperture 64 sized and shaped to be in registry with the aperture 28 and, therefore, the entire image area 22a of successive ones of the film units 22 that are sequentially presented to the aperture. The carriage 46 has a pick slot (not shown) which allows picking of individual ones of exposed film units 22 from the cassette 24 when the latter is in the film processing position.

With continued reference to FIGS. 2–5 an interlock device 66 is arranged to snap-fit onto opposite sides of the carriage 46 and extend over the film cassette 24. The interlock device 66 includes a pair of rearwardly extending interlock spring fingers 68 which prevent the cassette 24 from being loaded onto the carriage 46 in the wrong manner (i.e. aperture facing upwardly).

Forwardly extending from the film interlock device 66 is a pair of spring members 70 each having a downwardly extending tab which normally yieldably engages a datum surface 38 on each side of the cassette 46. Each tab is also engageable with a respective datum projection 40 as will be explained. This yieldable biasing of the spring members 70 allows the carriage to overtravel relative to the cassette 24 for purposes of allowing overcentering of a coupling member which will be made clear subsequently. The inner surface of the sidewalls of the carriage 46 provide frictional resistance to movement of the cassette 24 and since the biasing force of the springs 70 is greater than the frictional resistance, the springs 70 will position the cassette forwardly in the carriage. If the cassette 24 is not originally in contact with the springs 70, then closing of the front wall or door 42d will push the cassette 24 and thereby the projections 40 into engagement with the springs. The film interlock device serves as a means for permitting overcentering of a coupling member to be described.

Figure 2:
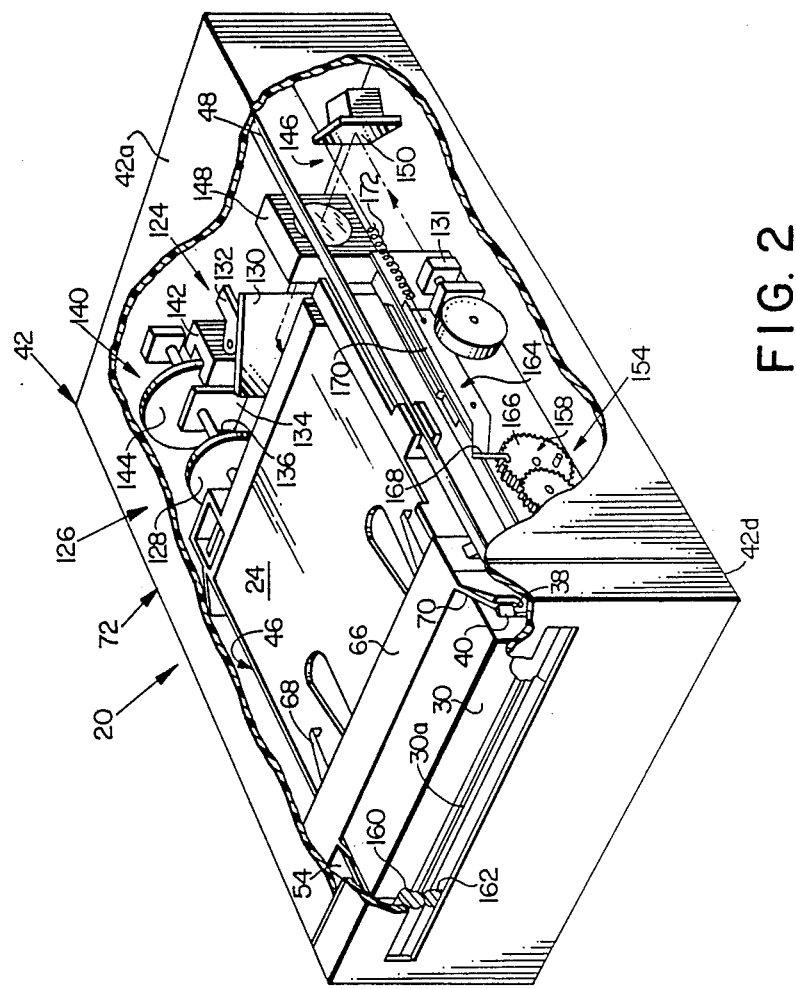
FIG. 2 is another perspective view but with different portions removed.
Figure 3:
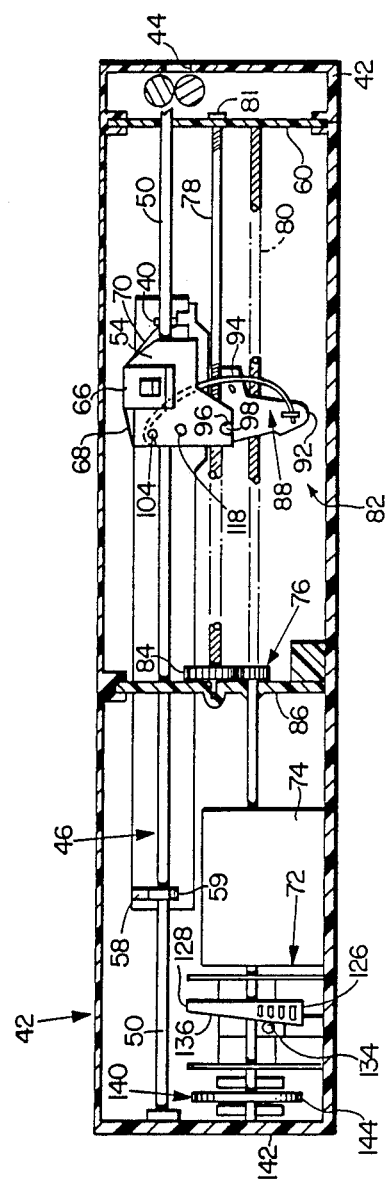
FIG. 3 is a cross-sectional elevational view showing details of a preferred embodiment.

Provision is made for a compact and integral scanning mechanism or means 72. Reference is made to FIGS. 2 and 3 for showing the scanning mechanism 72. The scanning mechanism 72 is operable for driving both the fast and slow scanning movements as is described better in the last noted application. A brief description of such a mechanism is given so as to better understand this invention.

For effecting slow scan movement and rapid return movement there is provided driving means which includes an electric driving motor 74, a gear reduction arrangement 76 and a pair of slow scan and rapid return lead screws 78 and 80; respectively, each being selectively coupled to a coupling means or mechanism 82. The motor 74 imparts rotational displacement to the counterrotating lead screws 78, 80. Both the lead screws 78, 80 extend generally parallel to the linear path of the carriage 46 and are journalled for rotation in the spaced apart mounting plates 60.

Figure 10:
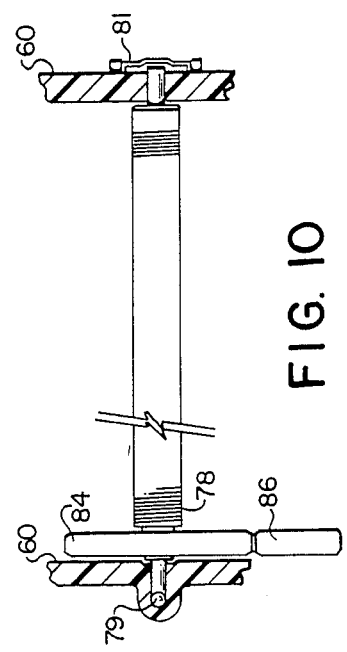
FIG. 10 is an enlarged cross-sectional view showing the mounting of one of the drive shafts used in the printing apparatus.

The gear reduction arrangement 76 includes gears 84 and 86 which are fixedly mounted on respective ones of the lead screws 78, 80 for rotation therewith. The gear 84 meshingly engages the gear 86 and rotatably drives the latter at a greater speed. Hence, the lead screw 78 drives the carriage 46 at a slower rate. Given the fact that the rapid return lead screw 80 rotates at a much faster speed, the film cassette carriage 46 can, therefore, return to the start printing position at a correspondingly faster speed. Hence, the printing apparatus 20 can effectively expose and print more individual film units per unit time. Additionally, the return lead screw 80 has a pitch, for example 24 tpi, which is lower than the slow scan lead screw 78. This assists quicker return speed as well. As shown in FIG. 10, there is provided a polished bearing ball 79 housed in a recess therefor in one of the mounting plates 60. A polished end of the screw shaft 78 contacts the ball under the urging of a spring clip 81. This cooperation facilitates the holding of precision of the operating components during slow scan.

Reference is now made to the coupling mechanism 82 which includes a toggle nut assembly 88 and a pair of spaced apart actuator assemblies 90 (see FIGS. 5 and 6–9). With regard to FIGS. 6–9, it will be noted that a sidewall 42c has been removed but that the operative components of coupling means on the sidewall remain for clarity of understanding operation of the invention. The toggle nut assembly 88 is selectively engageable with respective ones of the lead screws 78, 80 for facilitating the driving of the carriage 46 in opposite directions and at different speeds. Such selective engagement is in response to the actuator assemblies 90 selectively engaging the toggle nut assembly 88 as the latter moves.

Figure 4:
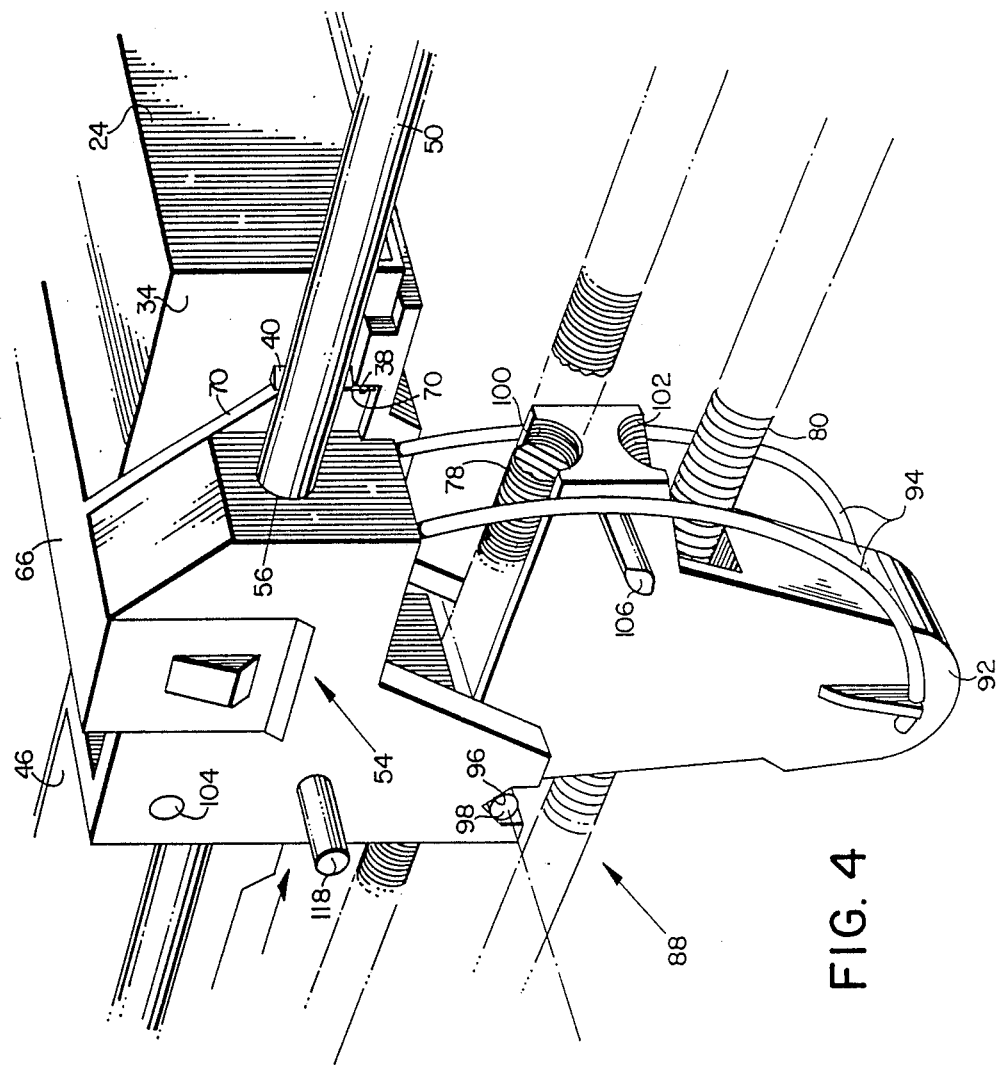
FIG. 4 is an enlarged perspective view of a toggle nut assembly of the present invention.

Reference is now made to the toggle nut assembly 88 (see FIG. 4). It includes essentially, the molded block 54, a toggle nut camming member or block 92 and a pair of bowed overcenter springs 94. The molded block 54 has formed on spaced apart bottom portions thereof vee-slots 96. Each vee-slot 96 is formed to receive in a nested relationship thereto respective ones of pivot posts 98 extending from opposite sides of the toggle nut camming block 92. As a result thereof, the toggle nut camming block 92 can pivot relative to the molded block 54 and the lead screws 78, 80. The axes of the pivot posts intersect the axis of the lead screw 78. Accordingly, carriage movement deviation caused by lead screw runout is minimized greatly. The toggle nut camming block 92, when engaged, converts the rotary motion of either of the lead screws 78, 80 to rectilinear carriage movement.

The toggle nut camming block 92 has dual threaded portions 100, 102 each one of which is threadedly engageable with respective ones of the lead screws 78, 80. The threaded portions 100, 102 generally converge towards the rightmost end, as viewed in FIG. 4, of the camming block 92. The converging facilitates the toggle nut camming block 92 engaging only one of the lead screws and also facilitates mounting and adjusting of the block between relatively closely spaced lead screws. This enhances compactness of the toggle nut assembly 88. The bowed overcenter springs 94 yieldably retain the toggle nut camming block 92 to the molded block 54. Because of the spring biasing, wear reduction of the threads does not have a serious affect on the movement of the carriage 46. Accordingly, image artifacts which might be caused by such wear is reduced significantly. The overcenter springs 94 pull the carriage 46 downwardly and the camming block 92 upwardly. End portions of the overcenter springs 94 have hooked mounting sections. Upper end portions of the overcenter springs 94 fit through an opening formed in the molded block 54 and have their mounting sections cooperating with a transversely extended rod 104 in the molded block. The hooked mounting sections on opposite ends of the overcenter springs 94 are hooked onto a pair of protrusions on the camming block 92. One projection from the camming block 92 is a camming post 106 (FIGS. 5 and 6–9). As will be described, movement of the carriage 46 in either direction, results in the camming post 106 engaging a backup cam 108 while engaging a bent arm 110 (FIGS. 5 and 6–9) of a reversing spring 112 which form part of the actuator assemblies 90. Each reversing spring 112 is secured to the sidewall 42c by a threaded member 114 (FIG. 5). Posts extending from the sidewall 42c engage opposite ends of each of the reversing springs 112, such as shown in the drawings. As noted in FIGS. 6-9 operative components on the sidewall 42c, such as springs 112, threaded members 114 and backup cams 108 are depicted for better understanding the operation of this invention while the sidewall 42c is not depicted.

A description of the operation of the coupling mechanism 82 will be given. Reference is made to FIGS. 3, 4 and 6-9. Slow scan takes place with the motor 74 driving the carriage 46 at about the rate of 300 microns per revolution of the slow scan lead screw 78 from the position shown in FIG. 9 to the position shown in FIG. 6. As the carriage advances rightwardly, the camming post 106 rides onto the backup cam 108 (FIG. 6), whereby the camming block 92 is even more firmly held in engagement with the slow scan lead screw 78. As described earlier, during slow scan, the carriage 46 moves towards the pressure applying rollers. Also the camming post 106 will engage a bent arm 110 which causes deflection of the reversing spring 112. The biasing force of the reversing spring 112, following sufficient deflection, when released is such as to overcome the biasing force of the overcenter springs 94, to thereby shift or flip the camming block 92 to the other position (e.g. engaging the lead screw 80, see FIG. 7). It will be understood, that the reversing spring 112 cannot flip the camming block 92 until the camming post 106 slides off the backup cam 108 as will be later explained. During the slow scan, the cassette carriage 46 continues to be driven by the motor 74 until the switch 116 is closed by contact with a switch post 118 on the block 54. As a result, the slow scan lead screw 78 and the carriage 46 come to rest. At this point in time the film picking mechanism, to be described, becomes active to withdraw an exposed film unit 22 from the cassette 46. The depicted position (FIG. 6) is referred to the film processing position. The carriage 46 comes to rest at a location so that the camming post 106 remains engaged firmly by the backup cam 108 which provides a solid support, whereby loading and unloading of the cassette 24 from the carriage 46 will not cause undesired movement of the latter. As noted earlier, when in this position, the camming post 106 cocks the reversing spring 112. The backup cams 108 provide reaction members for bending of the reversing springs so that released stored energy of the latter can overcome the overcenter springs.

Figure 7:
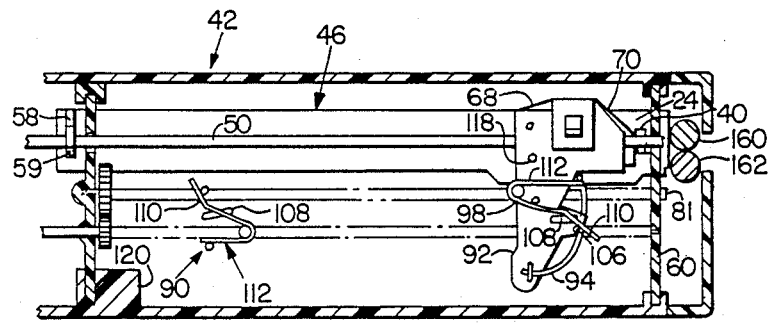

When the carriage 46 is to return to the start printing position, the motor 74 is again operated to drive the slow scan lead screw 78 so that the carriage overtravels or advances slightly rightwardly as viewed in the drawing (see FIG. 7) whereby the camming post 106 falls off the backup cam 108. Thus, the deflected reversing spring 112 can release the stored energy to overcome the biasing of the overcenter springs 94 and as a result flip the camming block 92 to the position, whereat the threaded portion 102 engages the rapid return lead screw 80. During this slight overtravel or rightward movement, the carriage 46 will advance slowly towards the processing roller assembly (not shown). The cassette 24, if not already touching the processing roller assembly at that point in time will do so and come to a stop while the carriage 46 overtravels rightwardly relative to the cassette. In this regard, the spring members 70 which engage the projections 40 deflect sufficiently to allow the carriage 46 to continue to advance enough so that the camming post 106 falls off the precipice of the backup cam 108. During such a process, the camming post 106 is driven downwardly by the reversing spring 112 whereby this movement results in the pivoting of the toggle nut camming block 92 downwardly. Accordingly, the threaded portion 102 engages the lead screw 80 and the overcenter springs 94 which initially resist flipping will eventually assist in flipping the camming block 92 to this new position (FIG. 7).

Figure 8:
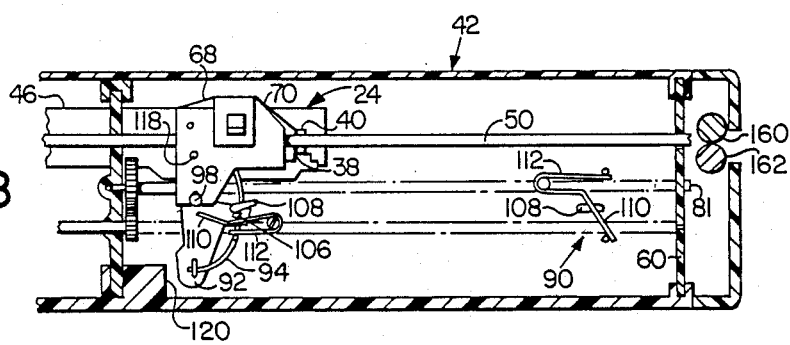

The carriage 46 will then be driven rearwardly at a much faster rate. It being kept in mind that both the lead screws 78, 80 are rotating simultaneously. During carriage return, the camming post 106 will eventually engage the other backup cam 108 (FIG. 8). As a result, the camming block 92 more firmly engages the rapid return lead screw 80. The backup cam 108 also facilitates cocking the bent arm 110 of the other reversing spring 112 until there is enough stored energy therein, so that when released it overcomes the combined biasing forces of the overcenter springs 94. The overcenter springs 94, of course, assist in flipping the camming block 92 so it reengages the slow scan lead screw 78. It should be noted that there is provided a bumping pad 120 which engages the bottom of the camming block 92 near the end of its return stroke. The pad 120 insures that the camming block 92 upon engagement therewith will pivot upwardly slightly and out of engagement with the rapid return lead screw 80. Of course, this disengagement occurs when the camming post 106 is free of the backup cam 108. The reversing spring 112 is thereby able to drive the camming block 92 upwardly, which upward movement is eventually assisted by the overcenter springs 94 themselves. Accordingly, the threaded portion 100 once again engages the lead screw 78.

Figure 9:
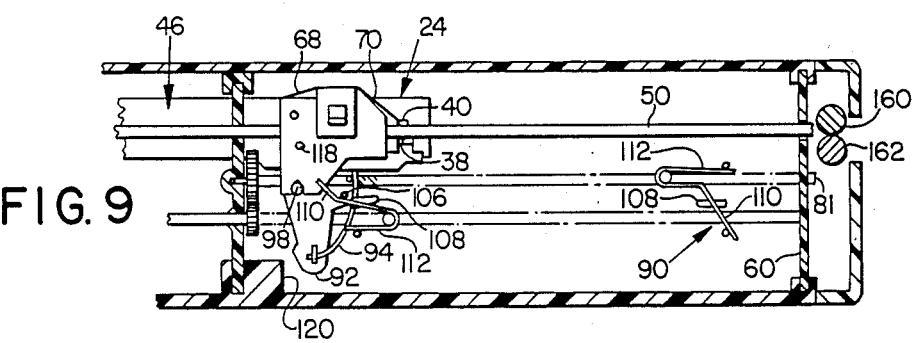

The switch post 128 is situated so that it opens a switch 122 on the sidewall 42c (FIG. 5) when the camming block 92 reengages the slow scan lead screw 78. The motor 74 then ceases operation and the carriage 46 comes to rest in the start printing position (FIG. 9). Because of carriage momentum, the switch post 118 is slightly placed beyond the switch 122 so that it reengages the switch to close the same when the motor 74 operates again to commence carriage movement in the opposite direction. In such a situation, the switch 122 when closed will signal the control circuit (not shown) to start the fast scanning and printing operations.

Since the printing operation does not, per se, form an aspect of the present invention and is generally the same as described in the aforementioned application only a brief description thereof will be set forth. Briefly, however, this slow scan motion continues until the switch post 118 contacts the switch 116 whereupon the control circuit signals the motor 74 to stop operating. The carriage 46 comes to rest as shown in FIG. 6. Closing the switch 116 will also be effective to commence operation of the film picking mechanism to be described. Accordingly, a film processing operation commences.

Reference is now made back to the fast scanning operation. Only a brief description will be given since a more detailed description is given in the last noted application. As noted, simultaneously with the slow scanning, there is provided fast scanning. Fast scanning is considered movement of modulated light spots across the width of the film units 22. Both the slow and fast scanning movements provide for raster scan imaging on the film's image forming areas.

Reference is again made to FIGS. 2 and 3 for showing the scanning mechanism 72 which performs the fast and slow scanning movements. For a more detailed description of the structure reference is made to the last noted application. For understanding this invention, however, it will be understood that for fast scanning there is included an oscillatable scanning mirror assembly 124 that is directly oscillated by a mirror driving mechanism 126. The mirror driving mechanism 126 includes a rotatable cam 128 directly connected to an output shaft of the driving motor 74. The scanning mirror assembly 124 includes a generally rectangular scanning mirror 130 mounted for oscillation about a vertical axis defined by an upstanding support 132. The scanning mirror 130 deflects the bundles of light being emitted from a light source of light emitting diodes (not shown) mounted on a board 131. Essentially, the scanning mirror 130 scans the film plane with a plurality of light spots emitted by the diodes.

A cam follower 134 is integral with the scanning mirror 130 and has one end thereof biased against a camming surface 136 of the cam 128 by a biasing spring (not shown). This spring is connected to and between the cam follower 134 and a post (not shown) in the housing assembly 42 for yieldably urging the scanning mirror 130 to the starting scan position which is defined by the mirror contacting a stop (not shown) in the housing assembly 42. As the camming surface 136 rotates in response to rotation of the output shaft, the cam follower 134 will effect mirror oscillitation. The cam profile establishes the position of the pixels on the film.

In this embodiment there is provided an optical encoding mechanism 140. Each time a signal is sensed by an optical sensor 142 of the encoding mechanism 140 a light source (not shown) as will be explained, is energized to emit light. Associated with the optical sensor 142 of the encoding mechanism 140 is an encoding wheel 144. The encoding wheel 144 is attached to an output shaft of the motor 74, as is generally described in the last noted application. The encoder wheel 144 has encoding marks (not shown) thereon which function with the optical sensor 142 to provide encoder tick clock pulses. In this embodiment, each encoder tick of the sensor 142 is transmitted to a data clock (not shown) in the control circuit (not shown). Thereafter, encoder responsive clock pulses are transmitted to a microcomputer (not shown) in the control circuit. Image data received by the microcomputer, from any well-known source, such as magnetic tape or disc is thereafter directed to circuitry (not shown) which modulates the intensity of the output of light emitting diodes of the light source. Of course, the electronic image data may be enhanced. Thus, energization of the light emitting diodes is a function of the speed of motor output shaft since the encoder tick pulses are dependent upon the rotational displacement of the encoding wheel.

Brief reference is made to FIG. 2 for illustrating an optical system 146 for use in the image printing apparatus 20. This optical system 146 is like that described in the previously noted application. Hence, a detailed description is not given herein since it does not form part of the present invention. The optical system 146 of his embodiment is essentially a preobjective scanning optical system, whereby the light emitted from the light emitting diodes scans along a predetermined flat path. Included in the optical system 146 is a lens group 148 which directs the beams from a stationary mirror 150 to the scanning mirror 130. From the scanning mirror 130 the beams are directed to a light converging lens group (not shown). From the light converging lens group the beams of light strike a pair of suitably placed reflecting mirrors (not shown) and go through the scanning slot (not shown) onto the flat film plane.

Continued reference is made to FIG. 2 for showing a film procesing mechanism 154 for processing each of the exposed film units 22. Again, reference is made to the last noted application for describing in greater detail the structure and operation of the film processing mechanism. The processing mechanism 154 includes a motor (not shown), a gear train assembly 158 for driving a pair of film processing rollers 160 and 162 of a processing roller assembly and a film picking mechanism generally indicated by 164. The processing rollers 160 and 162 are supported in the front door 42d of the housing assembly 42 and are spaced apart by a predetermined gap which gap facilitates formation of a desired processing fluid thickness used for processing the film units. A pair of springs (not shown) is provided, each one of which yieldably biases an end portion of the topmost processing roller 160. The processing rollers 160 and 162 provide progressive pressure on the film units 22 as the latter travel therepast to initiate the diffusion transfer process.

Film picking mechanism 164 as is described in the last noted application, functions to pick a film unit 22 towards the processing rollers. The film picking mechanism 164 functions like that described in the last noted application. Hence, a detailed description is not given herein. However, a brief description will be given. A projection on the sequencing gear 166 is arranged to engage a tab 168 at the forward end of a pick slide 170. This engagement causes sliding movement of the pick slide 170 towards the forward position of the housing assembly 42. It will be appreciated that the pick slide 170 is suitably mounted and moves against the urging of a spring 172 which has its other end attached to the housing assembly 42. The spring 172 returns the pick slide 170 to its normal at rest position when the projection on the sequencing gear 166 no longer engages the tab 168. However, upon engagement of the tab 168 by the sequencing gear 166, the pick slide is advanced for a limited stroke which is effective to cause a pick arm (not shown) connected to the pick slide 170 to engage a film unit 22. The pick arm travels through a slot (not shown) in the film carriage 46 and cutout (not shown) in the film cassette 24. Continued rotation of the sequencing gear 166 will, of course, result in the pick arm advancing the film unit through the exit slot 30a, whereby the leading edge of the exited film unit is brought into engagement with the nip of the processing rollers 160, 162.

Continued rotation of the sequencing gear 166 causes its projection to rotate, so then it will engage arms of a switch (not shown). This switch is effective through the control circuit to stop operation of the processing mechanism motor. Engagement of the switch occurs after the film unit has been advanced from both the film cassette and the housing assembly by the processing rollers. Accordingly, a film unit can be removed by an operator.

After the above descriptions of the electronic printer apparatus 20 and especially the coupling mechanism 82, it is believed that the operations thereof are clear. To supplement such understanding, however, the following is set forth.

To commence a printing operation, the control circuit is effective to energize the motor 74. Accordingly, the gear reduction mechanism 76 is effective to simultaneously counterrotate both the lead screws 78, 80. It will be recalled that in the start printing position the carriage 46 is in the position of FIG. 9 with the threaded portion 100 of the toggle nut camming block in engagement with the slow scan lead screw 78. Hence, the carriage 46 and film cassette 24 are driven towards the processing rollers 160, 162 at a slow rate. The switch post 118 will engage the switch 116 and cause the motor 74 and thereby carriage movement to stop. Stoppage occurs while the camming post 106 is engaged with the backup cam 108 and causes deflection of the reversing spring 112. The backup cam 108 provides support for the carriage and a reaction surface so that the arm 110 can be deflected. While the carriage is in this position, the film picking mechanism 164 and the film processing mechanism 154 are operated to eject the exposed film unit from the apparatus 20.

To return the carriage to the start printing position, the motor 74 is again operated. Since the camming block 92 is still in engagement with the slow scan lead screw 78, the carriage 46 will advance rightwardly along with the camming block 92. The cassette 24 will be prevented from rightward movement because it engages the processing roller assembly (not shown). As the carriage 46 overtravels, the camming post 106 falls off the precipice of the backup cam 108. The stored energy of the deflected reversing spring 112 is now free to overcome the initial resistance of the overcenter springs 94 and drive the camming block 92 into engagement with the rapid return lead screw 80. The overcenter springs 94 will act to drive the camming block 92 into engagement with the return lead screw 80 after, of course, the camming block passes the overcenter position. Return of the carriage 46 to the start printing position commences upon such engagement.

The carriage 46 will eventually come to rest at the start position after the switch post 118 engages the switch 122. This causes the motor 74 to stop operation. Just prior to the switch 122 being contacted and the carriage coming to rest, the camming post 106 will fall off the backup cam 108 and the reversing spring 112 is sufficiently strong so that the latter can flip the camming block into engagement with the slow scan lead screw 78. Thus a cycle of carriage movement has been completed. Accordingly, the carriage can be moved as noted without requiring the motor to reverse direction of movement.

Figure 11:
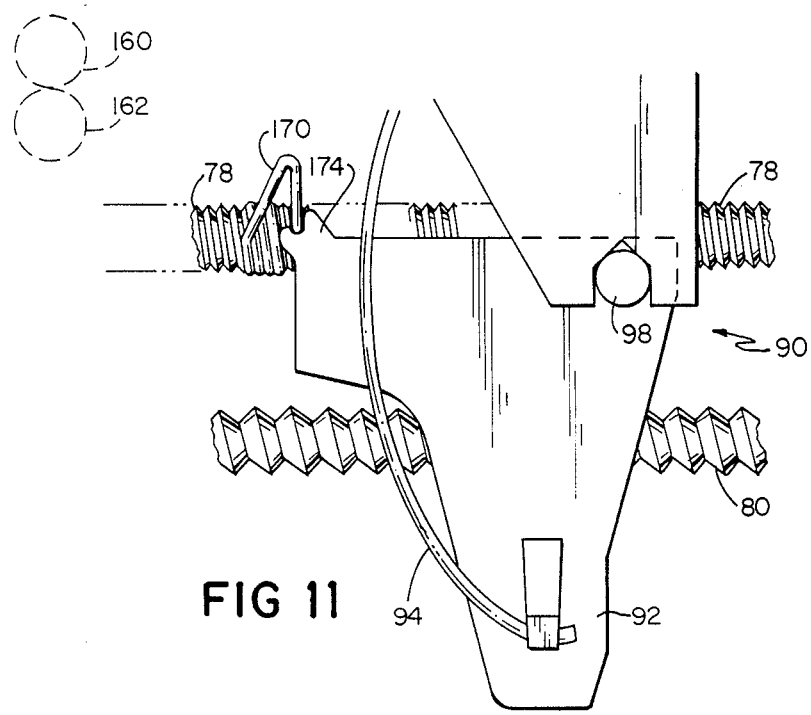
FIG. 11 is an enlarged and fragmented side elevational view of a second embodiment showing a coil spring wrapped on one of the lead screws.
Figure 12:
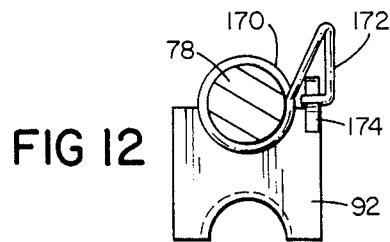
FIG. 12 & 12A are end views of FIG. 11 showing the cooperation between the coil spring and a coupling member; and, FIG. 13 is a cross-sectional side elevational view of the second embodiment.
Figure 13:
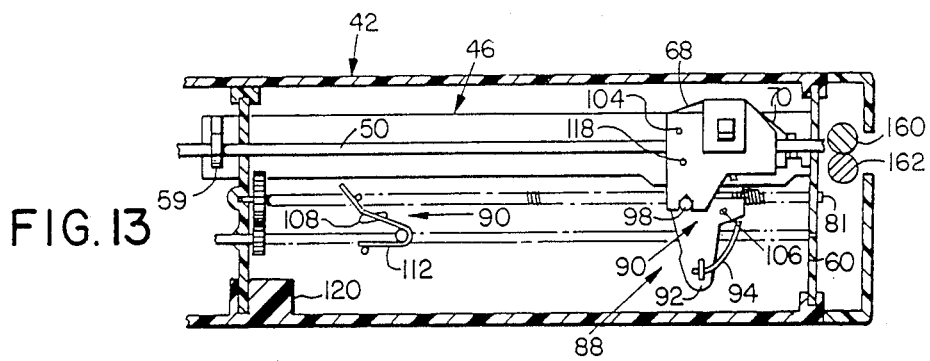

Reference is made to FIGS. 11-13 for showing an alternate embodiment of the present invention. In this embodiment, one of the actuator assemblies includes a wrap clutch spring 170 wrapped onto the lead screw 78 as shown best in FIG. 11. The wrap clutch spring 170 serves as a reversing spring. The wrap clutch spring 170 is wrapped in a direction which is the same as the threads of the lead screw 78. Thus, if the lead screw 78 is right handed, the spring 170 is wrapped in a right handed manner. The spring 170 rotates with the lead screw 78. Accordingly, the spring 170 wraps tightly onto the lead screw 78 upon engagement with the camming block 92. As a result, the spring 170 will not be displaced and thus remains in its intended position during lead screw rotation or engagement with the block 22.

Figure 12A:
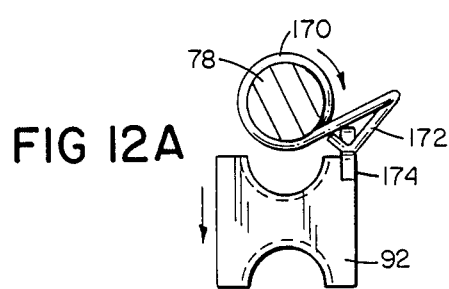

It will be noted that the spring 170 has a bent prong 172 which is sized and shaped as shown in FIGS. 12 and 12A, to engage a nest 174 formed on the camming block 92 as shown in FIGS. 11-12A.

As the lead screw 78 rotates, the prong 172 forces the camming block 92 downwardly against the bias of the overcenter spring 94 and beyond the overcenter position. Thus, the camming block 92 will threadedly engage the other lead screw 80.

The wrap clutch spring 170 obviates the need of a backup cam and reversing spring arrangement of the previous embodiment. The present embodiment provides an approach simpler in construction and operation compared to the one above. Moreover, less wear on the components is experienced with the present embodiment and precise positioning of all the previously noted components is less of a concern.

The present invention envisions that a fixed projection could be provided on the lead screw 78 for forcing the camming block 92 beyond the overcenter position. However, the coil spring provides a simple and efficient approach.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for printing images on respective ones of a plurality of image recording units which are releasably retained in a cassette therefor, said apparatus comprising:

a housing assembly;

means disposed in said housing assembly for mounting the cassette for bidirectional movement in opposing first and second directions between first and second positions;

driving means operable for reciprocating said cassette mounting means in opposing directions between the first and second positions, said driving means advancing said cassette mounting means in the first direction from the first position to the second position so that an image of a subject selected for printing is recorded on an image recording unit, said driving means thereafter returning said cassette mounting means in the second direction to the second position at a different speed than when travelling in the first direction, said driving means including a driving motor, a pair of spaced apart and generally parallel threaded driving shafts mounted for rotation, a gear mechanism connected to said driving motor for driving one of said driving shafts at a different speed from the other of said driving shafts;

coupling means connected to said cassette mounting means and being shiftable in response to actuation thereof to selectively engage said one or said other driving shaft for alternately linearly reciprocating said cassette mounting means between the first and second positions;

overcenter biasing means for biasing said coupling means and thereby respective ones of said threaded portions into engagement with respective ones of said driving shafts after said coupling means is past an overcenter condition thereof;

a pair of spaced apart actuator assemblies, each being effective for effecting shifting of said coupling means overcenter between said one and said other driving shafts in response to operative engagement with said coupling means wherein at least one of said actuator assemblies includes means disposed on and rotatable with one of said driving shafts for engaging and shifting said coupling means into engagement with said other shaft.

2. The apparatus of claim 1 wherein:

said shifting means disposed on said one driving shaft includes a reversing spring wrapped thereon and said spring has a portion arranged to engage said coupling means so as to shift said coupling means into engagement with said other shaft.

3. An electronic image printing apparatus for printing images on respective ones of a plurality of image recording units which are releasably retained in a cassette therefor, said apparatus comprising:

a housing assembly;

means disposed in said housing assembly for mounting the cassette for bidirectional movement in opposing printing and return directions between start and processing positions;

means for providing at least a beam of light and for modulating the light beam in response to electronic signals corresponding to an image of a subject selected for printing;

light scanning means operable for scanning the modulated light beam across a preselected scanning line on one of the image recording units;

means for optically directing the modulated light beam to said light scanning means and from said light scanning means to an image plane of the one image recording unit;

means for ejecting successive scanned recording units from the cassette and said housing assembly when the cassette is in the processing position;

driving means operable for reciprocating said cassette mounting means in the opposing directions between the start and processing positions wherein as said light scanning means scans the modulated light beam across the scanning line, said driving means advances said cassette mounting means in the printing direction from the start position to the processing position so that a raster scan image of the subject selected for printing is scanned on the one image recording unit by the modulated light beam; said driving means returns said cassette mounting means in the return direction at a different speed than when travelling in the printing direction;

said driving means includes a driving motor; a pair of spaced apart and generally parallel threaded driving shafts mounted for rotation, a gear mechanism connected to said driving motor for driving one of said driving shafts at a different speed from the other of said driving shafts;

coupling means connected to said cassette mounting means and being shiftable in response to actuation thereof to selectively engage said one or said other driving shaft for alternately linearly reciprocating said cassette mounting means between the start and processing positions;

overcenter biasing means for biasing said toggle nut coupling means and thereby respective ones of said threaded portions into engagement with respective ones of said driving shafts after said coupling member is past an overcenter conddition thereof;

a pair of spaced apart actuator assemblies, each being effective for effecting shifting of said coupling means overcenter between said one and said other driving shafts in response to operative engagement with said coupling means wherein at least one of said actuator assemblies includes means disposed on and rotatable with one of said driving shafts for engaging and shifting said coupling means into engagement with said other shaft.

4. The printer of claim 3 wherein:

said shifting means disposed on said one driving shaft includes a reversing spring and said spring has a portion arranged to engage said coupling means so as to shift said coupling means into engagement with said other shaft.

* * * * *